United States Patent
Oofuji et al.

(10) Patent No.: US 7,386,124 B2
(45) Date of Patent: Jun. 10, 2008

(54) BLOCK ENCODING METHOD AND BLOCK ENCODING/DECODING CIRCUIT

(75) Inventors: Iwao Oofuji, Kanagawa (JP); Tsutomu Ichinose, Tochigi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/496,306

(22) PCT Filed: Oct. 8, 2003

(86) PCT No.: PCT/JP03/12877

§ 371 (c)(1),
(2), (4) Date: Jun. 13, 2005

(87) PCT Pub. No.: WO2004/034171

PCT Pub. Date: Apr. 22, 2004

(65) Prior Publication Data

US 2005/0232414 A1    Oct. 20, 2005

(30) Foreign Application Priority Data

Oct. 9, 2002    (JP) .............................. 2002-295808

(51) Int. Cl.
*H04L 9/00*    (2006.01)
*H04K 1/04*    (2006.01)
*H04L 9/06*    (2006.01)
*H04L 9/18*    (2006.01)

(52) U.S. Cl. ........................... 380/37; 380/42; 380/43; 380/277; 713/189

(58) Field of Classification Search ..................... None
See application file for complete search history.

(56) References Cited

U.S. PATENT DOCUMENTS 5,867,579 A  *  2/1999  Saito ........................... 705/57
5,966,448 A  *  10/1999  Namba et al. ................. 380/33

(Continued)

FOREIGN PATENT DOCUMENTS

JP    6-149153    5/1994
JP    8-287014    11/1996

OTHER PUBLICATIONS

Alfred J Menezes et al., "Handbook of Applied Cryptography" CRC Press, pp. 223-237.*

(Continued)

*Primary Examiner*—Christopher Revak
*Assistant Examiner*—Trang Doan
(74) *Attorney, Agent, or Firm*—Oblon, Spivak, McClelland, Maier & Neustadt, P.C.

(57) ABSTRACT

A block cipher method eliminates the overhead associated with key scheduling, decreases the required time for encryption or decryption, and increases the total throughput. A key scheduling circuit (12) for generating round key data from key data for the encryption or the decryption and a bank memory (13) for storing the round key data generated by the key scheduling circuit (12) at a predetermined bank of the bank memory are provided. An encrypting/decrypting circuit (11) is provided for encrypting plaintext data or decrypting ciphertext data upon receipt of the round key data stored in the bank and a block of the plaintext data or the ciphertext data one by one. The output of the encryption or the decryption is retrieved from the encrypting/decrypting circuit (11).

2 Claims, 4 Drawing Sheets

U.S. PATENT DOCUMENTS

| | | | |
|---|---|---|---|
| 6,985,582 B1 * | 1/2006 | Sano et al. | 380/42 |
| 7,006,628 B2 * | 2/2006 | Garstin et al. | 380/42 |
| 7,203,310 B2 * | 4/2007 | England et al. | 380/200 |
| 7,221,763 B2 * | 5/2007 | Verbauwhede | 380/277 |
| 2002/0051536 A1 * | 5/2002 | Shirakawa et al. | 380/45 |
| 2002/0124177 A1 * | 9/2002 | Harper et al. | 713/189 |
| 2002/0176572 A1 * | 11/2002 | Ananth | 380/37 |
| 2002/0191784 A1 * | 12/2002 | Yup et al. | 380/37 |

OTHER PUBLICATIONS

Alfred J Menezes et al. "Handbook of Applied Cryptography", Oct. 1996, CRC Press, pp. 223-237.*

* cited by examiner

BLOCK ENCODING METHOD AND BLOCK ENCODING/DECODING CIRCUIT

TECHNICAL FIELD

The present invention relates to a block cipher method and a block encryption/decryption circuit.

BACKGROUND ART

A block cipher circuit using the Advanced Encryption Standard (AES) is one of the cipher circuits for encrypting plaintext data. Such an AES block cipher circuit divides data to be encrypted into, for example, 128-bit blocks and encrypts them one by one with round key data. The round key data is generated from key data for the encryption by a key scheduling process (refer to, for example, "AES gaisetu", [online], dated Jun. 11, 2002, IWATA Lab., Department of Electrical & Computer Engineering, Nagoya Institute of Technology, [searched on Oct. 8, 2002], at http://mars.elcom.nitech.ac.jp/security/aes.html).

Thus, when ciphertext data is re-encrypted, that is, when the ciphertext data is decrypted into plaintext data with corresponding round key data, and then encrypted again into ciphertext data with another piece of round key data, the process flow is as follows:

The process is described with reference to FIG. 4.

1. Original ciphertext data, key data for decryption, and key data for encryption are prepared in a host computer 1.

2. The host computer 1 transfers the key data for decryption to a key scheduling circuit 2, which performs key scheduling to generate round key data for decryption.

3. The host computer 1 transfers one block of the ciphertext data to an encryption/decryption circuit 3, which decrypts the block into plaintext data with the round key data generated in step 2.

4. The host computer 1 transfers key data for encryption to the key scheduling circuit 2, which performs key scheduling to generate round key data for encryption.

5. The plaintext data generated in step 3 is encrypted into ciphertext data with the round key data generated in Step 4.

6. The re-encrypted data generated in step 5 is transferred back to the host computer 1.

7. Steps 2 to 6 are repeated for the next block of original ciphertext data.

In the case where two tasks on a multi-task operating system (OS) use a single encryption/decryption circuit, round key data corresponding to each task must be generated to encrypt or decrypt as in the above-described steps.

Unfortunately, the key scheduling process generally requires about twice the processing time for the encryption or decryption. Accordingly, the key scheduling for each block or for each task in multitasking, shown in step 2 or 4, causes considerable overhead, thus decreasing the total throughput of the encryption or decryption.

Accordingly, it is an object of the present invention to overcome these problems.

DISCLOSURE OF INVENTION

The present invention provides, for example, a block cipher method including the steps of: generating first round key data depending on key data for decryption, storing the first round key data at a first location of a memory, generating second round key data depending on key data for encryption, storing the second round key data at a second location of the memory, decrypting blocks of input ciphertext data one by one into plaintext data with the first round key data, and encrypting the blocks of plaintext data one by one with the second round key data.

Accordingly, the key scheduling overhead is eliminated, thus increasing the total throughput.

BEST MODE FOR CARRYING OUT THE INVENTION 1.1 Configuration of a Block Encryption/Decryption Circuit 10

Figure 1:
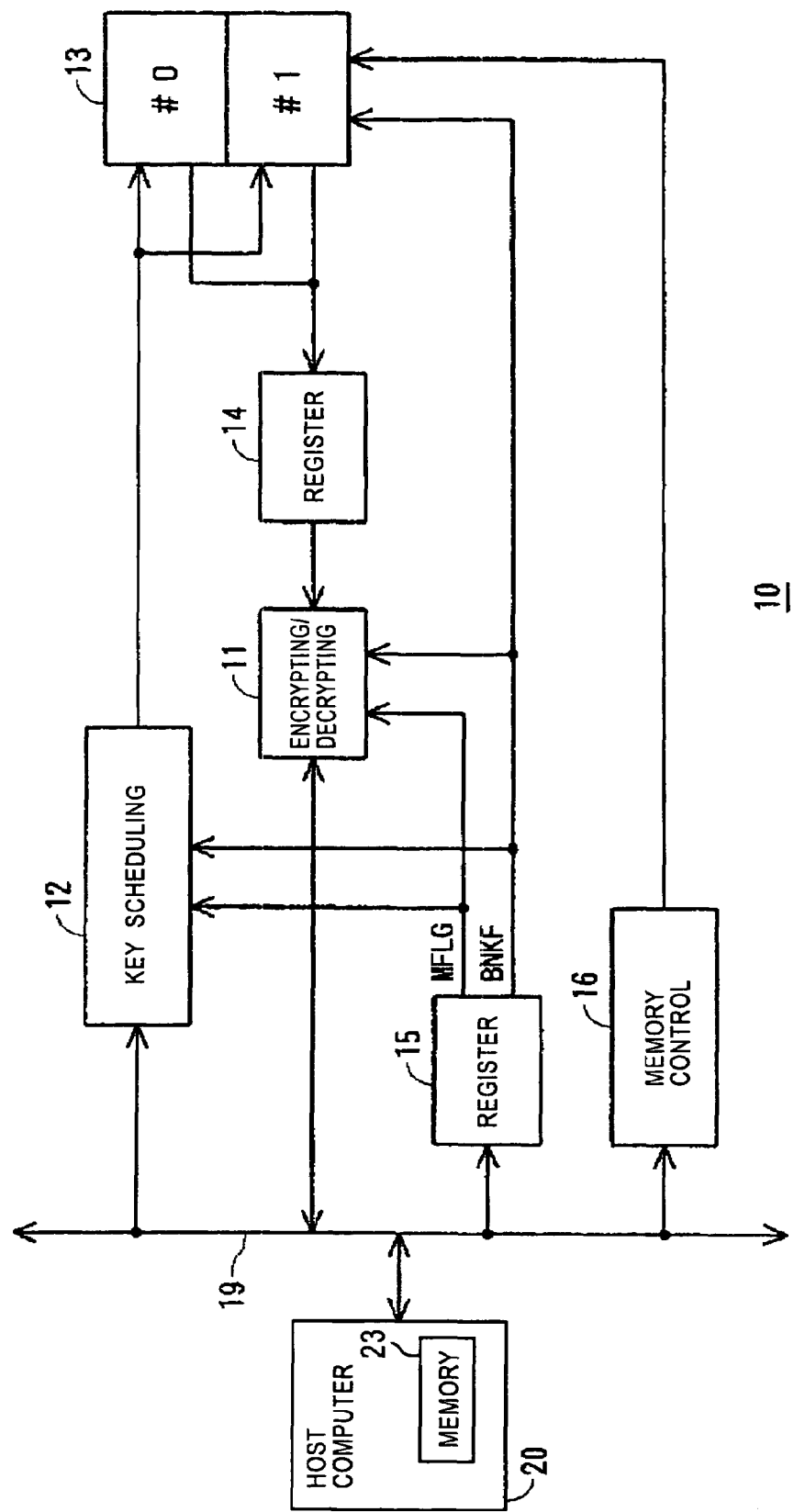
FIG. 1 is a schematic diagram of an embodiment of the present invention.

With reference to FIG. 1, reference numeral 10 denotes the overall structure of a block encryption/decryption circuit according to the present invention and reference numeral 20 denotes a host computer that connects the block encryption/decryption circuit 10. In this embodiment, the block encryption/decryption circuit 10 can execute fast re-encryption of ciphertext data.

To achieve this object, a memory 23 of the host computer 20 stores ciphertext data to be re-encrypted, key data for decrypting the ciphertext data into plaintext data, and key data for re-encrypting the plaintext data into encrypted data. One block of the original ciphertext data is, for example, 128 bits and the length of the key data for the encryption or decryption is also 128 bits.

The block encryption/decryption circuit 10 has two modes. In the first mode, round key data for decryption is generated from the key data for the decryption and is stored in the memory, while round key data for encryption is generated from the key data for the encryption and also is stored in the memory. In the second mode, a decryption of the ciphertext data block into a plaintext data block and a re-encryption of the plaintext data block are alternately carried out for the series of blocks by using the round key data stored in the memory in the first mode.

That is, the block encryption/decryption circuit 10 includes an encrypting/decrypting circuit 11 and a key scheduling circuit 12. In this case, the encrypting/decrypting circuit 11 decrypts a block of the ciphertext data into plaintext data with the round key data for decryption, and encrypts a block of the plaintext data into encrypted data with the round key data for encryption. Additionally, the key scheduling circuit 12 generates the round key data for decryption from the key data for decryption and generates the round key data for encryption from the key data for encryption.

The encrypting/decrypting circuit 11 and the key scheduling circuit 12 are connected to an internal bus 19 of the block encryption/decryption circuit 10. The internal bus 19 is connected to the host computer 20.

Additionally, in the block encryption/decryption circuit 10, a register 15 is connected to the internal bus 19. The register 15 has a mode flag MFLG. The mode flag MFLG is set by the host computer 20 and supplied to the encrypting/ decrypting circuit 11 and the key scheduling circuit 12 to control the circuits as follows:

When MFLG="0", the encrypting/decrypting circuit 11 is disabled and the key scheduling circuit 12 is enabled.

When MFLG="1", the encrypting/decrypting circuit 11 is enabled and the key scheduling circuit 12 is disabled.

Further, the block encryption/decryption circuit 10 has a bank memory 13 and a register 14. In this embodiment, the bank memory 13 has a pair of banks #0 and #1, which store the round key data for the encryption and the decryption generated by the key scheduling circuit 12, respectively. For this purpose, the register 15 has a switching flag BNKF, which is set by the host computer 20 and supplied to the bank memory 13 as a control signal to switch the banks. The bank memory 13 is controlled as follows:

When BNKF="0", the bank #0 is enabled and the bank #1 is disabled.

When BNKF="1", the bank #0 is disabled and the bank #1 is enabled.

Furthermore, the block encryption/decryption circuit 10 has a memory control circuit 16, which controls read/write of the round key data from/to the bank memory 13 and its addresses.

The output of the bank memory 13 is temporarily stored in the register 14, and then supplied to the encrypting/decrypting circuit 11 as the round key data.

In addition, the switching flag BNKF of the register 15 is supplied to the encrypting/decrypting circuit 11 for the following control:

When BNKF="0", the encrypting/decrypting circuit 11 carries out the decryption.

When BNKF="1", the encrypting/decrypting circuit 11 carries out the encryption.

Figure 2:
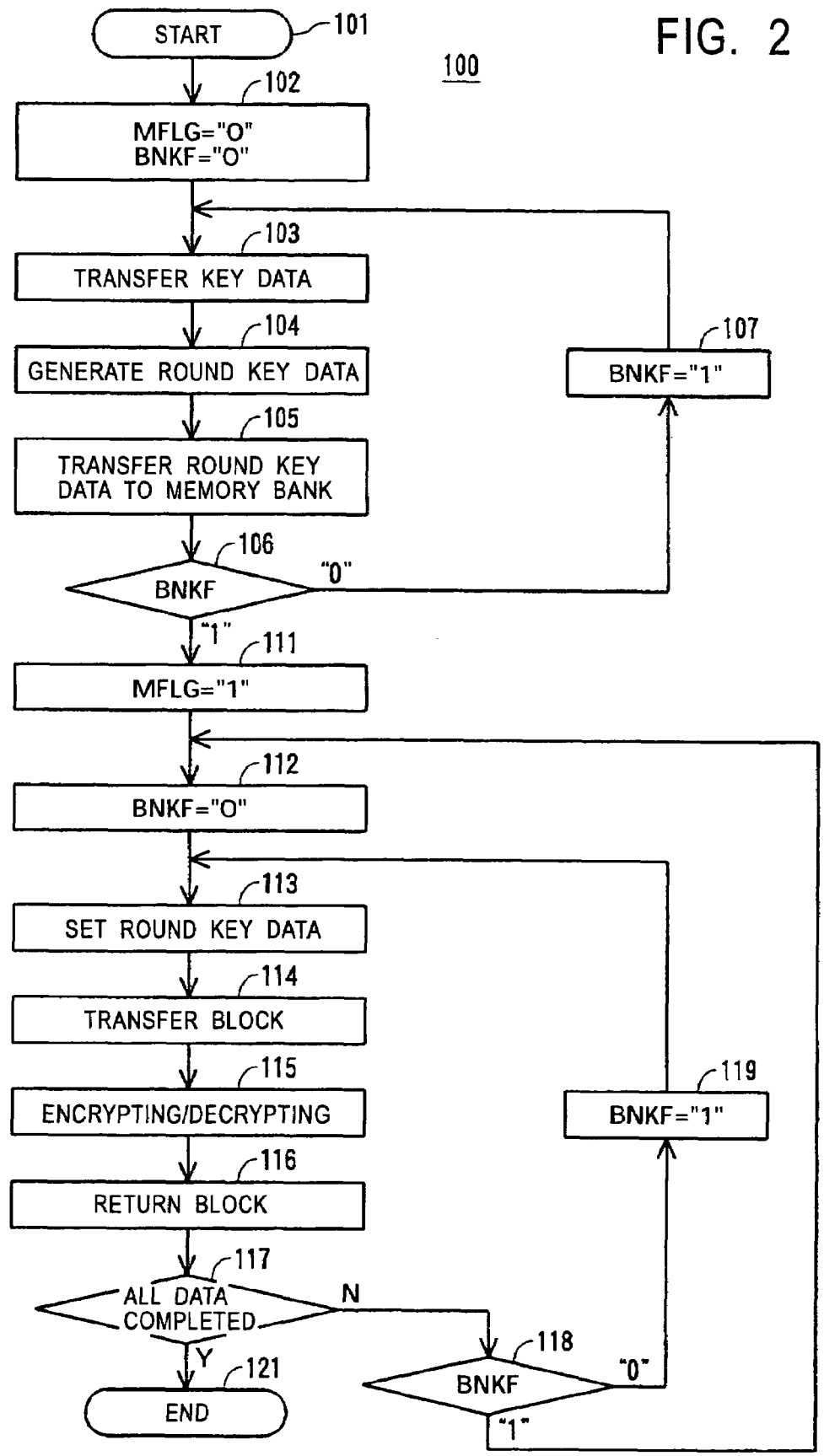
FIG. 2 is a flow chart showing the process flow of the circuit shown in FIG. 1.

The block encryption/decryption circuit 10 carries out the re-encryption of ciphertext data stored in the host computer 20 in the flow shown in, for example, a flow chart 100 in FIG. 2. The process will be described hereinafter.

1.2 Re-Encryption Process of the Block Encryption/Decryption Circuit 10.

The re-encryption of the ciphertext data starts at step 101 in the flow chart 100. As shown in step 102, the flags MFLG and BNKF in the register 15 are then set to level "0" by the host computer 20. Accordingly, the mode flag MFLG enables the key scheduling circuit 12 and disables the encrypting/decrypting circuit 11, while the switching flag BNKF enables the bank #0 and disables the bank #1.

Subsequently, the host computer 20 sets the mode flag MFLG to level "0" so that, as shown in step 103, the host computer 20 transfers the decryption key data, which is one of the key data items stored in the memory 23, to the key scheduling circuit 12. As shown in step 104, the key scheduling circuit 12 generates round key data from the key data transferred in step 103. At this point, BNKF="0"; hence, round key data for the decryption is generated.

In step 105, the round key data generated in step 104 is transferred to the bank memory 13 by the memory control circuit 16. At this point, since the bank #0 of the bank memory 13 is enabled in step 102, the round key data is stored in the bank #0. Then, in step 106, the level of the switching flag BNKF is checked. At this point, BNKF="0"; hence the process flow proceeds from step 106 to step 107, where the switching flag BNKF in the register 15 is set to level "1" by the host computer 20. The process flow then returns to step 103.

Hence, corresponding to BNKF="1", the key data for encryption, which is the other key data stored in the memory 23, is transferred to the key scheduling circuit 12 (step 103). Round key data for the encryption is generated from the key data (step 104). The round key data is written into the bank #1 of the bank memory 13 (step 105). At this point, BNKF="1" in step 106; hence, the process flow proceeds from step 106 to step 111. At that time, the round key data for the decryption and the round key data for the re-encryption are stored in the bank #0 and the bank #1 of the bank memory 13, respectively.

In step 111, the mode flag MFLG of the register 15 is set to level "1" so that the mode flag MFLG disables the key scheduling circuit 12 and enables the encrypting/decrypting circuit 11. In step 112, the switching flag BNKF is set to level "0" so that the switching flag BNKF enables the bank #0, disables the bank #1, and enables the encrypting/decrypting circuit 11 to carry out the decryption.

In step 113, the round key data stored in the enabled bank #0 or #1, on this occasion, in the bank #0, is supplied to the encrypting/decrypting circuit 11 via the register 14. In addition, as shown in step 114, the nth block of the ciphertext data stored in the memory 23 of the host computer 20, on this occasion, the first block, is transferred to the encrypting/decrypting circuit 11. Since BNKF="0", as shown in step 115, the block of the ciphertext data transferred in step 114 is decrypted into plaintext data with the round key data supplied in step 113.

In step 116, the block of the plaintext data decrypted in step 115 is returned to the memory 23 of the host computer 20. In step 117, it is determined whether the process of all the data in the memory 23 is completed. At this point, it is not completed, then the process flow proceeds to step 118.

In step 118, the switching flag BNKF is checked. At this point, since BNKF="0" in step 112, the process flow proceeds to step 119, where the switching flag BNKF of the register 15 is set to level "1". Thereafter, the process flow returns to step 113.

Accordingly, steps 113 to 116 are repeated again. In this case, BNKF="1", so that the bank #1 of the bank memory 13 is enabled and the round key data for the encryption is retrieved and supplied to the encrypting/decrypting circuit 11 (step 113). The block of plaintext data decrypted in the immediately preceding step 115 is supplied from the memory 23 of the host computer 20 to the encrypting/decrypting circuit 11 (step 114). Since BNKF="1", the encrypting/decrypting circuit 11 carries out the encryption (step 115). Accordingly, the first block of the original ciphertext data is re-encrypted and the block of the re-encrypted ciphertext data is returned to the host computer 20 and written into the memory 23(step 116).

At this point, since only one block is re-encrypted, the process flow proceeds from step 117 to step 118. Since BNKF="1", the process flow then returns to step 112.

Consequently, as described above, the second block of the ciphertext data in the memory 23 is decrypted into plaintext data and is re-encrypted into ciphertext data in steps 111 to 119. Also, the decryption into the plaintext data and re-encryption into the ciphertext data are carried out by using the round key data for the decryption and encryption stored in banks #0 and #1 of the bank memory 13 in steps 101 to 105.

After the entire ciphertext data in the memory 23 is re-encrypted, the process flow proceeds from step 117 to step 121 and the flow chart 100 completes.

Thus, the ciphertext data in the memory 23 is re-encrypted. In this embodiment, the re-encryption requires the round key data for the decryption and re-encryption. These round key data are prepared in the banks #0 and #1 of the bank memory 13 in advance, thereby only one key scheduling is sufficient for each of the decryption and re-encryption. Consequently, the time required for re-encrypting the ciphertext data is significantly decreased, thus increasing the total throughput.

2 Recording and Playback Unit

Figure 3:
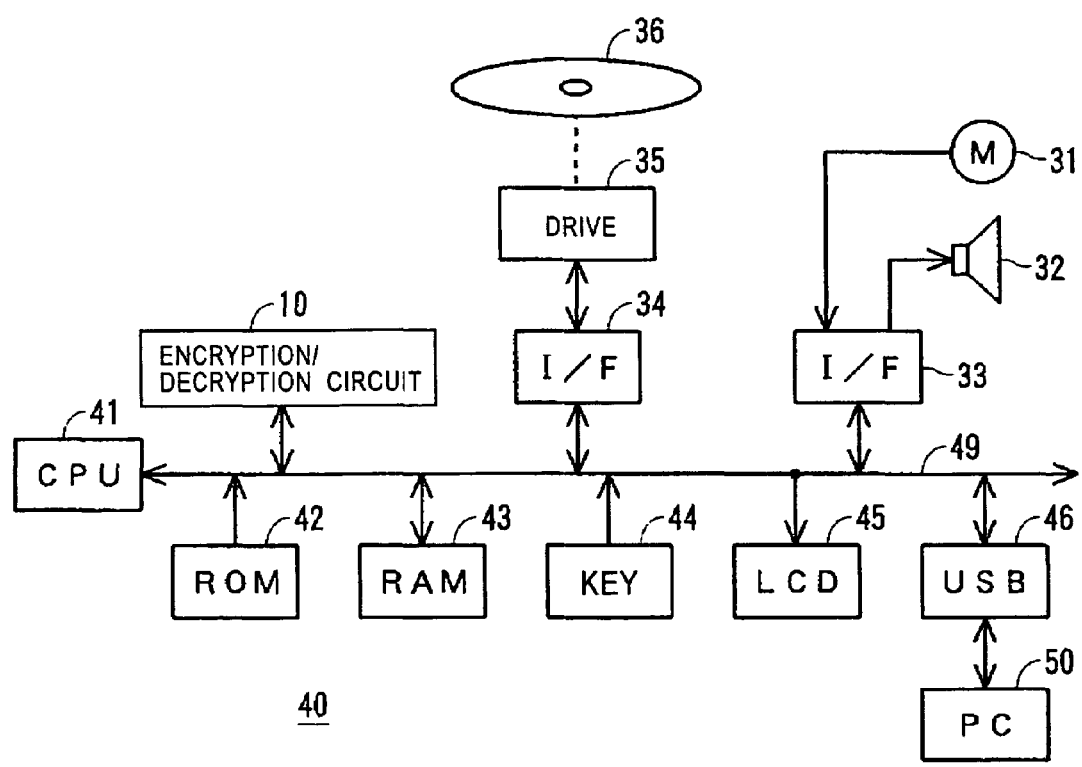
FIG. 3 is a schematic diagram of an embodiment of the present invention.
Figure 4:
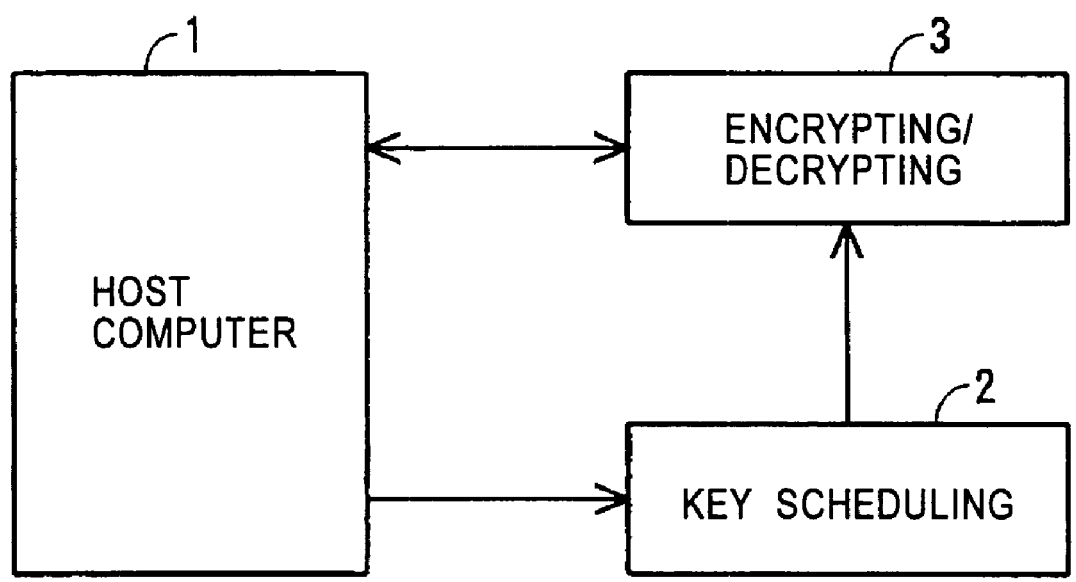
FIG. 4 is a schematic diagram showing a process flow to re-encrypt ciphertext data in a known method.

FIG. 3 shows an embodiment according to the present invention applied to a CD-R/RW recording and playback unit.

Thus, reference numeral 31 denotes a signal source of audio signal, such as a microphone 31, and reference numeral 32 denotes a destination of the audio signal, such as a speaker 32. These are connected to a system bus 49 of a microcomputer 40, which will be described below, via an audio interface circuit 33. Also, a disk drive unit 35 is connected to the system bus 49 via a disk interface circuit 34. A disk 36, such as a Compact Disc Recordable (CD-R) or a Compact Disc ReWritable (CD-RW), is mounted in the disk drive unit 35.

The microcomputer 40 corresponds to the host computer 20 in the embodiments 1.1 and 1.2, and constitutes a system control circuit that controls the overall operation of the recording and playback unit. The microcomputer 40 includes a central processing unit (CPU) 41, a read only memory (ROM) 42, in which various types of programs and data are written, and a random access memory (RAM) 43 for a working area, which are all connected to the system bus 49. Further, the block encryption/decryption circuit 10, which is described in the embodiments 1.1 and 1.2, is connected to the system bus 49 via the internal bus 19. A part of the address area of the RAM 43 is used as the memory 23.

Furthermore, various types of operation keys 44 and a display, such as a liquid crystal display (LCD) 45, are connected to the system bus 49. A Universal Serial Bus (USB) interface circuit 46 is also connected to the system bus 49 as an external interface. An external peripheral, for example, a personal computer 50, is connected to the USB interface circuit 46.

During recording and playback, the following process is carried out depending on the presence of encryption or decryption.

2.1 Ordinary Recording

During recording without encryption, audio signals are supplied from the microphone 31 to the audio interface circuit 33 and are A/D (Analog-to-digital) converted to digital audio data. The digital audio data are supplied to the disk interface circuit 34 via the system bus 49, are encoded for error correction, and are EFM (Eight to Fourteen Modulation) modulated for recording. Then, the encoded and modulated signals are supplied to the disk drive unit 35 and are recorded onto the disk 36.

2.2 Ordinary Playback

Signals from the disk 36 are played back by the disk drive unit 35. The played-back signals are supplied to the disk interface circuit 34, in which the original audio data are retrieved through inverse processes to the recording processes, that is, EFM demodulation and a decoding process for error correction. The digital audio data are then supplied to the audio interface circuit 33 via the system bus 49 and are D/A (Digital to Analog) converted to analog audio signals, which are supplied to the speaker 32.

In the case where digital data other than the digital audio data are recorded to the disk 36 or played back from the disk 36, an encoding or decoding process for the data is required. These processes are also carried out by the disk interface circuit 34.

2.3 Encrypting and Recording of Audio Signals

In the case where the audio signals are encrypted and recorded to the disk 36, the audio signals are supplied from the microphone 31 to the audio interface circuit 33, in which the audio signals are A/D converted to digital audio data. The digital audio data is buffered and then supplied to the block encryption/decryption circuit 10. Thus, the digital audio data in the RAM 43 are block encrypted for every 2 K (1024) bytes into ciphertext data by the block encryption/decryption circuit 10, as described in the embodiments 1.1 to 1.2.

The ciphertext data in the RAM 43 are supplied to the disk interface circuit 34, encoded for error correction, and EFM modulated for recording, and are then supplied to the disk drive unit 35 to be recorded to the disk 36.

2.4 Playing Back and Decrypting of Audio Signals

In the case where the audio signals recorded on the disk 36 are decrypted and played back, the audio signals are played back from the disk 36 by the disk drive unit 35. The played-back signals are supplied to the disk interface circuit 34, in which the signals are decoded into the original ciphertext data. The ciphertext data are buffered in the RAM 43, and then, for example, every 2 K bytes of the data are supplied to the block encryption/decryption circuit 10 and block decrypted into the original digital audio data, as described in the embodiments 1.1 to 1.2.

The decrypted digital audio data are supplied from the RAM 43 to the audio interface circuit 33, and D/A converted into the original analog audio signals, which are supplied to the speaker 32.

2.5 Re-Encrypting of Audio Signals

This is the case where encrypted audio signals recorded on the disk 36 are re-encrypted, then output to, for example, the personal computer 50.

That is, after a playback of the disk 36 is initiated, like the embodiment 2.4, the playback signals from the disk 36 are decoded into the original ciphertext data by the disk interface circuit 34. The ciphertext data are sequentially written into the RAM 43. After some amount of the ciphertext data, for example, the ciphertext data in one sector of the disk 36, are written into the RAM 43, the process shown in the flow chart 100 is carried out so that the ciphertext data in the RAM 43 are re-encrypted and then supplied to the personal computer 50 via the USB interface circuit 46. Subsequently, the above-described process is repeated each time the ciphertext data in a sector of the disk 36 are played back.

Thus, the encrypted audio signals recorded on the disk 36 are re-encrypted to output to the personal computer 50. In this case, as described above, re-encryption overhead is eliminated so that the process can be carried out in real time during the playback of the disk 36.

3 Other Embodiments

In the foregoing embodiments, the case where the ciphertext data are re-encrypted is described. In the case where two tasks on a multi-tasking OS use the single block encryption/decryption circuit 10, the switching flag BNKF should be set to level "0" or level "1" in accordance with the executed task and steps 103 to 105 should be executed, and then steps 111 and 113 to 117 should be executed. Subsequently, the process flow returns from step 117 to step 113. These steps carry out the processes corresponding to either encryption or decryption. Similarly, in the cases of three or more tasks, a bank of the bank memory 13 should be switched to the bank corresponding to each task, and then steps 103 to 105, 111, and steps 113 to 117 should be executed.

Additionally, in the foregoing embodiments, the ciphertext data or the decrypted data has one piece of key data. It may have a plurality of pieces of key data. Furthermore, the encrypting/decrypting circuit 11 may be a generic block cipher circuit. The key scheduling circuit 12 may be incorporated in the encrypting/decrypting circuit 11.

According to the present invention, when a plurality of encryption or decryption processes are carried out in one encryption/decryption circuit, the round key data for the encryption or decryption are stored in banks of a bank memory. The key scheduling is carried out only once. Compared to the process requiring key scheduling for every block of plaintext data or ciphertext data, the overhead is eliminated, thus considerably decreasing the required time for the encryption or decryption and increasing the total throughput.

The invention claimed is:

1. A reencrypting method for a series of blocks of input ciphertext data, comprising:

enabling a first bank memory and a key scheduling circuit and disabling a second bank memory and an encrypting/decrypting circuit;

transferring decryption key data to the key scheduling circuit;

generating first round key data with the key scheduling circuit based on the decryption key data;

storing the first round key data in the first bank memory;

enabling the second bank memory and disabling the first bank memory;

transferring encryption key data to the key scheduling circuit;

generating second round key data with the key scheduling circuit based on encryption key data;

storing the second round key data in the second bank memory;

enabling the encrypting/decrypting circuit and the first bank memory and disabling the key scheduling circuit and the second bank memory;

transferring the first round key data and a block of this series of blocks of input ciphertext data to the encrypting/decrypting circuit;

decrypting the block of the series of blocks of input ciphertext data into plaintext data with the encrypting/decrypting circuit using the first round key data to create a block of plaintext data;

enabling the second bank memory and disabling the first bank memory;

transferring the second round key data and the block of plaintext data to the encrypting/decrypting circuit; and encrypting the block of plaintext data into re-encrypted data with the encrypting/decrypting circuit using the second round key data, wherein the decrypting and the encrypting are alternately carried out with the first and second key data stored in the first and second bank memory for every block of the series of blocks of input ciphertext data on a block-by-block basis after the enabling the encrypting/decrypting circuit.

2. A decryption/encryption circuit comprising:

a key scheduling circuit configured to generate first round key data based on decryption key data and generate second round key data based on encryption key data;

a first bank memory configured to store the first round key data;

a second bank memory configured to store the second round key data;

an decryption/encryption circuit configured to be inputted a series of blocks of ciphertext data, decrypt a block of the inputted series of blocks of ciphertext data into plaintext data with the first round key data stored in the first bank memory, and encrypt the decrypted block of the plaintext data with the second round key data stored in the second bank memory;

a first register configured to enable the key scheduling circuit and disable the decryption/encryption circuit, or enable the decryption/encryption circuit and disable the key scheduling circuit; and a second register configured to enable the first bank memory and disable the second bank memory, or enable the second bank memory and disable the first bank memory, wherein the decrypting/encrypting circuit is configured to alternately decrypt and encrypt every block of the series of blocks of ciphertext data on a block-by-block basis with the first and second key data stored in the first and second bank memory after the decrypting/encrypting circuit is enabled by the first register.

* * * * *